(12) United States Patent
Andre

(10) Patent No.: US 11,276,868 B2
(45) Date of Patent: Mar. 15, 2022

(54) FUEL CELL PLATE, CORRESPONDING CELL AND STACK

(71) Applicant: L'Air Liquide, Societe Anonyme pour l'Etude et l'Exploitation des Procedes Georges Claude, Paris (FR)

(72) Inventor: Johan Andre, Fontaine (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 68 days.

(21) Appl. No.: 16/486,369

(22) PCT Filed: Jan. 31, 2018

(86) PCT No.: PCT/FR2018/050218
§ 371 (c)(1),
(2) Date: Aug. 15, 2019

(87) PCT Pub. No.: WO2018/150117
PCT Pub. Date: Aug. 23, 2018

(65) Prior Publication Data
US 2020/0243874 A1    Jul. 30, 2020

(30) Foreign Application Priority Data

Feb. 16, 2017   (FR) ...................................... 1751257

(51) Int. Cl.
*H01M 8/026*    (2016.01)
*H01M 8/0206*   (2016.01)
(Continued)

(52) U.S. Cl.
CPC ......... *H01M 8/026* (2013.01); *H01M 8/0206* (2013.01); *H01M 8/0208* (2013.01);
(Continued)

(58) Field of Classification Search
None
See application file for complete search history.

(56) References Cited

U.S. PATENT DOCUMENTS

2002/0064702 A1* 5/2002 Gibb ................... H01M 8/2483
429/492

FOREIGN PATENT DOCUMENTS

EP    2 372 824    10/2011
WO    WO 00/41260   7/2000

OTHER PUBLICATIONS

Owejan et al., Water management studies in PEM fuel cells, Part I:Fuel cell design and in situ water distributions, International journal of hydrogen energy, 34, 3439-3444 (Year: 2009).*

(Continued)

*Primary Examiner* — Daniel S Gatewood
(74) *Attorney, Agent, or Firm* — Christopher J. Cronin

(57) ABSTRACT

A fuel cell plate comprising a face intended to route a fuel gas or an oxidizing gas to the active surface of a Membrane Electrode Assembly, said face of the plate comprising projecting ribs delimiting a determined number of channels provided for the circulation of gas, the channels having a determined length (LCA) and a determined width (E), the ribs having a determined width (LA), the plate being characterized in that the product P of the total length (LN) of the ribs on the plate per unit of active surface (in $cm^2$) multiplied by the rate of opening (TO) of the plate is between 4.7 and 10, i.e. that $4.7 < P\ (cm^{-1}) = LN \times TO/S < 10$, the rate of opening TO being defined by $TO = 100 \cdot (E/E + LA)$, the active surface of the plate being the surface of the plate intended to be facing the active surface of the Membrane Electrode Assembly.

14 Claims, 2 Drawing Sheets

(51) Int. Cl.
*H01M 8/0208* (2016.01)
*H01M 8/0213* (2016.01)
*H01M 8/0221* (2016.01)
*H01M 8/0226* (2016.01)
*H01M 8/1018* (2016.01)
*H01M 8/10* (2016.01)

(52) U.S. Cl.
CPC ....... *H01M 8/0213* (2013.01); *H01M 8/0221* (2013.01); *H01M 8/0226* (2013.01); *H01M 2008/1095* (2013.01)

(56) References Cited

OTHER PUBLICATIONS

International Search Report and Written Report for PCT/FR2018/050218, dated Apr. 24, 2018.
Li, et al., "Review of bipolar plates in PEM fuel cells: Flow-field designs", International Journal of Hydrogen Energy, vol. 30, No. 4, Mar. 1, 2005, pp. 359-371.
Owejan, et al., "Water management studies in PEM fuel cells, Part I: Fuel cell design and in situ water distributions", International Journal of Hydrogen Energy, vol. 34, No. 8, May 1, 2009, pp. 3436-3444.
Shimpalee, et al., "The impact of channel path length on PEMFC flow-field design", Journal of Power Sources, vol. 160, No. 1, Sep. 29, 20006, pp. 398-406.
French Search Report and Written Opinion for FR 1 751 257, dated Aug. 31, 2017.

\* cited by examiner

FUEL CELL PLATE, CORRESPONDING CELL AND STACK

CROSS-REFERENCE TO RELATED APPLICATIONS

This application is a § 371 of International PCT Application PCT/FR2018/050218, filed Jan. 31, 2018, which claims § 119(a) foreign priority to French patent application FR 1751257, filed Feb. 16, 2017.

BACKGROUND

Field of the Invention

The present invention relates to a fuel cell plate and to a cell and to a stack comprising such a plate.

The present invention relates to a fuel cell plate, notably for a fuel cell of the proton exchange membrane (PEM) type, comprising a face intended to convey an oxidant gas or fuel gas towards the active surface of a Membrane Electrode Assembly, said face of the plate comprising projecting ribs delimiting a determined number of channels intended for the circulation of gas, the channels having a determined length LCA and determined width E, the ribs having a determined width LA.

Related Art

Plates for fuel cells (be they monopolar or bipolar) are intended to guide the reagents (oxygen-containing oxidant and hydrogen-containing fuel) to the site of the electrochemical reactions of the fuel cells. More specifically, in proton exchange membrane fuel cells (PEMFCs), two fuel-cell stack plates sandwich a Membrane Electrode Assembly (MEA, or "AME" in French). The MEA is the strategic element of a cell of fuel cell stack because this is the site at which the electrochemical reactions of the cell take place. The fuel cell stack 7 comprises a stack of such cells 6 (CF FIG. 8).

Today, large-scale development of PEMFC technology has been limited by the high costs compared with the electrical power delivered. A significant proportion of this cost can be attributed to the MEA. The two plates notably have the functions of conveying the reacting gases to the largest possible proportion of the active surface of the MEAs (namely the surface at which the electrodes can be found).

In order to achieve this, the reactive faces of the plates that come into contact with the MEA for this purpose comprise reaction gas guide channels (one plate guides oxidant whereas the other plate guides fuel). The MEAs are arranged on the plates in such a way that the surface covered by the network of channels corresponds to the active surface of the MEAs. It is then possible to define two types of possible situation regarding the active surface. The MEA may thus either face the opening 2 of a channel, or face a rib 3 delimiting the channel 2 (in section perpendicular to the plane of the plate and perpendicular to the rib and to the channels, this rib takes the overall shape of a "tooth" or of a crenellation, and may be referred to as such in what follows).

The performance and lifetime of systems equipped with fuel cells is largely dependent on the quality of the conveying of the reagents and the management of the water produced by the reaction. The distribution of the reagents needs to be as uniform as possible, the MEA needs to maintain a good level of hydration and, at the same time, the water needs to be removed as much as possible from the porosity of the electrodes precisely in order to allow the reagents to access the reaction sites. More specifically, it is necessary to reach a compromise between the drying-out of the ionomer (the proton conductor of the membrane, also present in the electrodes) at the gas inlet, and the flooding of the electrodes at the outlet.

There are numerous publications concerned with the geometry of the plates, see for example document EP2372824A1.

A degree of openness of the plates can be defined as being the "open" percentage or fraction and which therefore measures the proportion of channels with respect to the total active surface area of the plate. This degree of openness (or openness percentage) is defined by $TO=100(E/(E+LA))$ where E=the width of the channels, and LA is the width of the rib (cf. FIG. 1).

Some of the publications of the prior art relating to bipolar plates indicate that reducing the length of the channels and the width of the ribs may have a positive effect on the performance of (PEMFC) fuel cells, but opinions as to the optimum value for the degree of openness of the configurations are divided.

These measures are beneficial but not enough to achieve higher power densities at cell level.

Neither is maximizing the degree of openness TO an end in itself: too great a rib width limits the performance in terms of the supply of gas reagent, whereas excessive channel width limits performance in terms of the electrical conductivity of the diffusion layers.

SUMMARY OF THE INVENTION

It is an object of the present invention to alleviate all or some of the above-mentioned disadvantages of the prior art.

To this end, the fuel cell plate according to the invention, in other respects in accordance with the generic definition thereof given in the above preamble, is essentially characterized in that the product P of the total length (LN) of the ribs on the plate per unit active surface area multiplied by the degree of openness (TO) of the plate is comprised between 4.7 and 10, that is to say: $4.7 < P\ (cm^{-1}) = (LN \times TO) < 10$, the degree of openness TO being defined by $TO=100(E/E+LA)$, the active surface area of the plate being the surface of the plate intended to face the active surface of the Membrane Electrode Assembly.

Thus, as defined in greater detail hereinafter, the inventors have discovered that it was possible to increase the performance of the cells by giving the parameter P formed by the product of the total length of the ribs per unit active surface area of the plate multiplied by the degree of openness or openness percentage a determined value.

The parameter P defined above, expressed in $cm^{-1}$, is comprised between 4.7 and 10 and preferably comprised between 7 and 9 inclusive. This is obtained by correlating the degree of openness and the width/length of the ribs of the channels in a particular way).

Moreover, embodiments of the invention may comprise one or more of the following features:
- on a plane of section perpendicular to the plane of the plate perpendicular to the axis of circulation of the channels, the ribs form right-angled crenellations,
- on a plane of section perpendicular to the plane of the plate perpendicular to the axis of circulation of the channels, the tops of the ribs are curved and convex, the junctions between the lower ends of the ribs and the surface of the plate which delimit the bottoms of the channels form sharp corners and/or progressive curves, in section on a plane perpendicular to the plane of the plate perpendicular to the axis of circulation of the channel delimited by the ribs concerned, the width of the channels is comprised between 0.19 and 0.49 mm, the ribs have a width comprised between 0.5 and 0.92 mm, the channels have a length comprised between 50 and 1000 mm, and preferably comprised between 200 and 500 mm, the plate is made at least in part of an electrically conducting material such as a metallic material or a metal alloy which has been pressed and/or molded and/or mechanically or chemically machined and/or embossed, notably of expanded graphite, the plate is made at least in part of a composite material that is been molded and/or machined, such as a carbon/polymer composite, the ribs have a cross section delimited by a curve of sinusoidal overall shape in a plane of section perpendicular to the plane of the plate and perpendicular to the axis of circulation of the channel delimited by the ribs concerned, the channels are arranged in parallel on the plate, the total length of all the ribs is equal to the number of channels on the plate plus one and multiplied by the channel length LCA, the total length of all the ribs LN per unit surface area being equal to LN=(number of channels+1)×(LCA) and referenced to the unit active surface area of the plate (for example unit surface area in $cm^2$)

the channels are arranged in parallel and have identical lengths consisting of the path followed by a channel (2) on the plate.

The invention also relates to a fuel cell stack cell comprising two plates sandwiching a Membrane Electrode Assembly, the plates being plates according to any one of the features above or below.

The invention also relates to a fuel cell stack comprising such a stack of cells.

The invention may also relate to any alternative device or method comprising any combination of the features above or below.

BRIEF DESCRIPTION OF THE FIGURES

Other particular features and advantages will become apparent from reading the following description, given with reference to the figures, in which.

DETAILED DESCRIPTION OF THE INVENTION

One parameter that can be used to measure the efficiency of fuel cell plates is the power density of the fuel cell stack (in $W/cm^2$) at a determined voltage, for example at a voltage of 0.6 V.

Table 1 below indicates the power density obtained at 0.6 V for various specimens of plate having a length LCA for the channels 2 (air), a width LA for the ribs 3, a width E for the channels 2 and a degree of openness TO.

In all of the specimens below, the channels 2 have the same channel length LCA (406 mm). It should be noted that the length LCN of a channel 2 is the path followed by the channel 2 on the plate (with its meanders, if any).

The total length LN of the ribs per unit active surface area of the plate (for example in $cm^2$) is defined as being the total length of all the ribs 3 (in contact with the MEA) in relation to the unit active surface area (for example per $cm^2$) of the plate.

Figure 9:
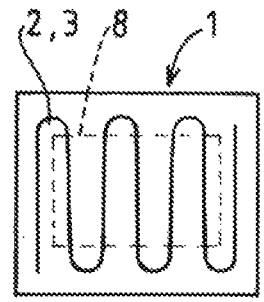
FIG. 9 is a face-on schematic view of the reactive face of a fuel cell plate illustrating the active surface of the plate with respect to the total surface of the plate.

As schematically indicated in FIG. 9, the channels 2 and ribs 3 may extend over the majority of the plate 1. However, only a fraction 8 of this surface is said to be "active" namely intended to be positioned facing the MEA of the cell. Thus, the total length LN of the ribs per unit active surface area is defined as being the total length of all the ribs 3 intended to be in contact with the MEA, in relation to the unit active surface area ($cm^2$) of the plate.

Typically, for a fuel cell stack plate 1, the active surface area is generally comprised between 5 $cm^2$ and 1200 $cm^2$ and represents approximately 60 to 95% of the total surface area thereof.

Note that, like with the channels 2, this length LN corresponds to the length of the "path" produced on the plate, forming meanders, if any. Thus, when a rib 3 winds its way across the plate, its length is the total (developed) distance covered along the plate in the active zone by the rib 3 (in the zone that exchanges with the active part of the MEA).

In table 1, the number of parallel channels 2 may differ from one specimen to another. This difference in the number of channels 2 therefore proportionately alters the total length LN of ribs available per unit active surface area. Specifically, for the theoretical case of a plate having a single channel 2 of length LCA, the total length of the ribs LN per unit active surface area is twice the length LCA of the channel 2 (because there are effectively two ribs 3 to delimit one channel 2).

In the case of more than two channels on the plate, there are (number of channels+1) edge corners. In effect, with the exception of the peripheral edge corners, the edge corners 3 are common to two adjacent channels 2.

The total length of rib LN per unit active surface area therefore varies with the number of parallel channels on the active surface.

For a given active surface and a given number of twists and turns of the channels/ribs, fixing the width E of the channels and the width LA of the ribs determines a total length LN of rib per unit surface area. For preference, the channels 2 on the plate make an even number of twists and turns in order to balance out the length and therefore the pressure drops between the channels 2.

The following relationship may be defined: Total length of all the ribs=(Number of channels in parallel+1)×(LCA).

Total length LN of ribs per unit surface area is this total length related to (divided by) the active surface area S.

LN is expressed for example in $cm^{-1}$.

The channel depth on each plate tested has been adjusted in order to obtain the same calculated pressure drop in order to make the results meaningful. This is because a greater pressure drop on a configuration considered separately might indicate a better performance. The experimental conditions for the comparison in table 1 therefore correspond to identical usual parameters for MEAs (membranes of the same type, temperature 65° C., air stoichiometry equal to 2.5, moisture content around 50%, . . . ).

dried-out zones at the inlet of the cell and zones that are flooded at the outlet. This is confirmed in the literature on the subject by the publication by S. Shimpalee et al. entitled "*The impact of channel path length on PEMFC flow-field design*" Journal of Power Sources 160 (2006) 398-406).

Figure 7:
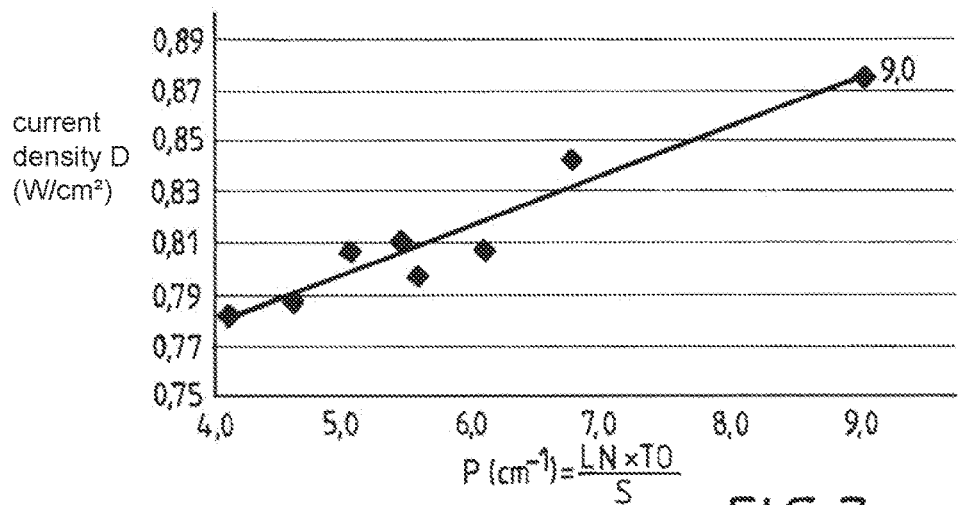

FIG. 7 illustrates the current density D in W/cm$^2$ (on the ordinate axis) obtained for the specimens of Table 1, as a function, on the abscissa axis, of P which is the total length

TABLE 1

| Specimen No | Number of parallel channels | Air channel length LCA (mm) | Rib width LA (mm) | Channel width E (mm) | Degree of openness TO (%) | Parameter P (cm$^{-1}$) | Power density at 0.6 V (W/cm$^2$) |
|---|---|---|---|---|---|---|---|
| 1 | 60 | 406 | 0.3 | 0.767 | 71.88% | 6.8 | 0.84 |
| 2 | 45 | 406 | 0.6 | 0.822 | 57.81% | 4.1 | 0.78 |
| 3 | 51 | 406 | 0.4 | 0.855 | 68.13% | 5.4 | 0.81 |
| 4 (reference) | 45 | 406 | 0.492 | 0.93 | 65.40% | 4.6 | 0.79 |
| 5 | 51 | 406 | 0.3 | 0.955 | 76.10% | 6.1 | 0.81 |
| 6 | 45 | 406 | 0.4 | 1.022 | 71.87% | 5.1 | 0.81 |
| 7 | 45 | 406 | 0.3 | 1.122 | 78.90% | 5.6 | 0.80 |

Figure 1:
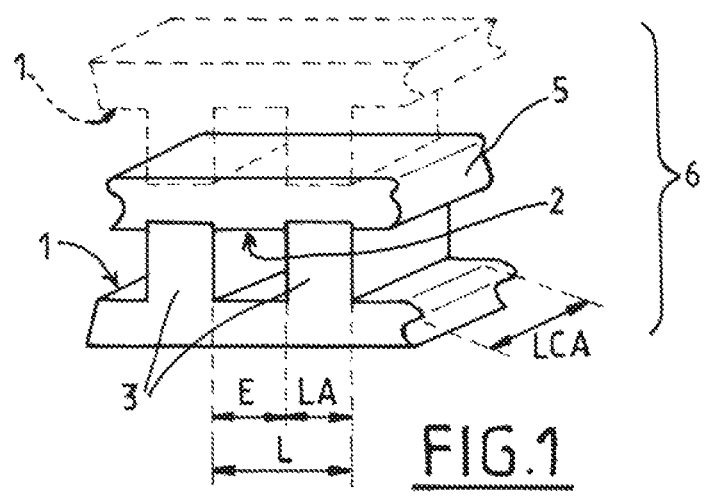
FIG. 1 depicts a schematic and partial perspective view of a detail of a cross section through a Membrane Electrode Assembly sandwiched between two fuel-cell stack plates.
Figure 2:
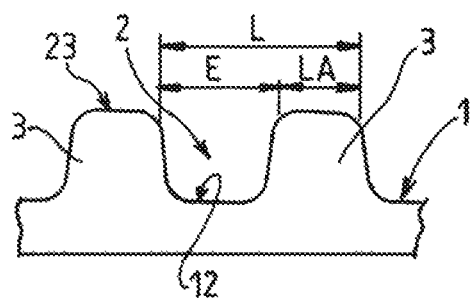
FIG. 2 is a schematic and partial cross-sectional depiction of a detail of a fuel-cell stack plate according to a second configuration.
Figure 3:
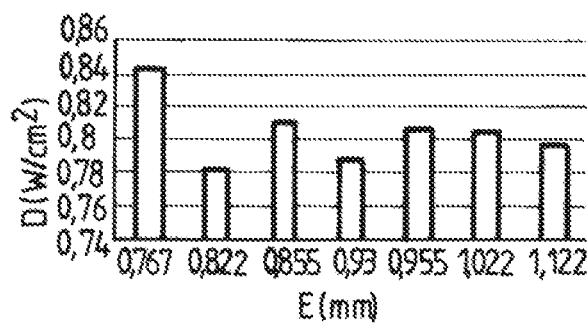
FIGS. 3 to 7 illustrate the current densities D (in $W/cm^2$ on the ordinate axis) obtained for various specimens of plate respectively according to various values for the geometric parameters of the plates (on the abscissa axis), FIG. 8 schematically depicts a fuel cell stack 7 comprising a stack of cells 6 comprising such plates.
Figure 8:
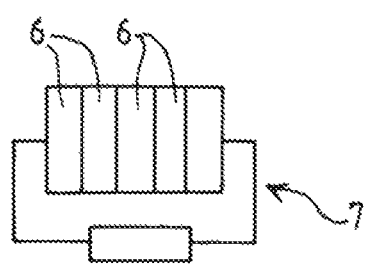

FIG. 3 illustrates the current density D (in W/cm$^2$ on the ordinate axis) obtained for the specimens of Table 1, as a function of the channel width E (in mm on the abscissa axis). This FIG. 3 indicates that the finer channels represent the configuration most beneficial to the current density obtained. That said, no clear trend can be established in the light of these results.

Figure 4:
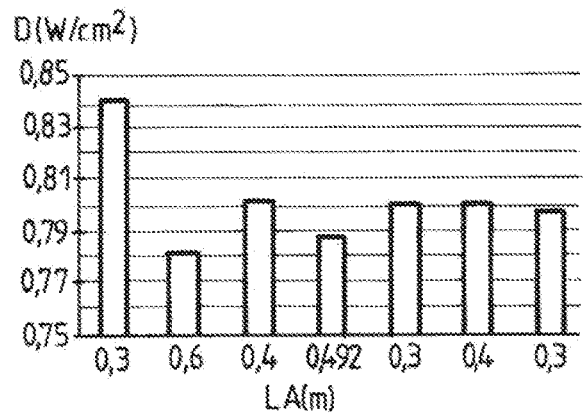

FIG. 4 illustrates the current density D in W/cm$^2$ (on the ordinate axis) obtained for the specimens of Table 1, as a function of the rib width LA in mm (on the abscissa axis). This figure indicates that a minimal rib width may correspond to the best configuration for power obtained (0.3 mm), but also to the least good (0.6 mm). Minimizing the width of the rib alone is therefore not necessarily enough to improve the performance of the cell 6 and therefore of the fuel cell stack 7 comprising a stack of such cells 6. Reducing the width LA furthermore runs up against the limits of precision of the manufacturing method (0.2 to 0.3 mm depending on the depth of the channels).

Figure 5:
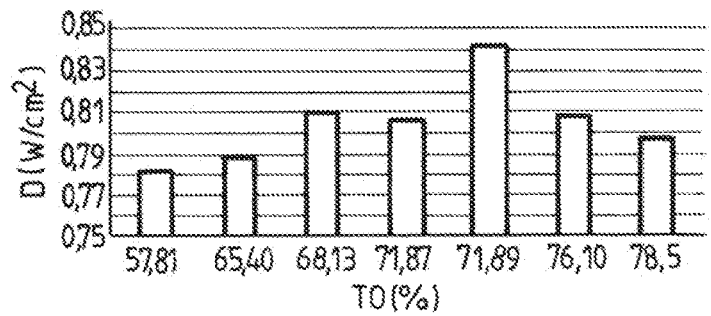

FIG. 5 illustrates the current density D in W/cm$^2$ (on the ordinate axis) obtained for the specimens of Table 1, as a function of the degree of openness TO as a percentage (on the abscissa axis). This figure indicates that maximizing the degree of openness TO does not systematically improve the performance and once again very similar values may correspond to significantly different levels of performance.

In the literature (cf. X.-D. Wang, Y.-Y. Duan, W.-M. Yan, X.-F. Peng, Journal of Power Sources 175 (2008) 397-407 or J. P. Owejan, J. J. Gagliardo, J. M. Sergi, S. G. Kandlikar, T. A. Trabold, International Journal of Hydrogen Energy 34 (2009) 3436-3444) opinions as to a possible optimal value for this parameter are divided.

The optimum may probably vary according to the nature of the components (thicker or less thick gas diffusion layer "GDL"), contact resistance between the plate material and the GDL material, and the fact that it is difficult, all other things being equal, to modify the degree of openness.

Figure 6:
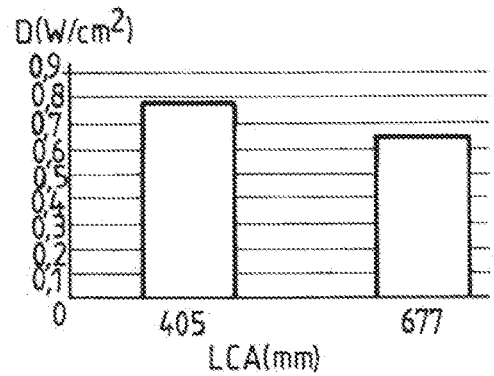

FIG. 6 illustrates the current density D in W/cm$^2$ (on the ordinate axis) obtained for the specimens of Table 1, as a function of the channel length LCA in mm on the abscissa axis. This figure indicates that short channels are better because that tends to reduce the magnitude of the rather (in cm) of ribs LN per unit surface area (in cm$^2$) multiplied by the openness percentage or degree of openness TO:

$$\text{parameter } P(\text{cm}^{-1}) \text{ on the abscissa axis} = (LN \times TO) = [(\text{Number of parallel channels} + 1) \times LCA/S] \times TO$$

S being the unit active surface area in cm$^2$.

This FIG. 7 illustrates a correlation that is more clear-cut than previously in terms of the improvement in power density. Note that this trend has been noticed "all other things being equal", namely when the pressure drop as well as the channel length are comparable across all the configurations and specimens studied.

The inventors have thus demonstrated that by adopting a product of the total length LN of the channels 2 per unit active surface area times the degree of openness (TO) of the particular plate, it is possible to increase the power density by approximately 4 to 10% in comparison with the plates of the prior art (all other conditions being equal).

This configuration appears to improve the compromise between the degree of usage of the plate (the proportion of surface of ribs in contact with the MEA) and the power obtained).

FIG. 7 makes it possible if appropriate to extrapolate the power density that might be achieved were it possible to manufacture plates with even finer ribs (even smaller width). Thus, for a tooth width of 0.2 mm (0.3/0.492 respectively), with 75 (45/60 respectively) channels in parallel, the total rib length would reach 61 m (37 m/49 m respectively), giving a parameter P (in cm$^{-1}$) (which is the rib length multiplied by the openness percentage related to the active surface area) equal to 9.0 (6.8/4.6 respectively), and therefore a power density at 0.6 V of 0.88 W/cm$^2$, a 4% progression from the best configuration tested here.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A fuel cell stack plate for a proton exchange membrane ("PEM") fuel cell, comprising a face intended to convey an oxidant gas or fuel gas toward an active surface of a membrane electrode assembly, said face comprising projecting ribs delimiting a determined number of channels intended for circulation of gas, the channels having a determined length (LCA) and a determined width (E), the ribs having a determined width (LA), wherein:

the plate has a degree of openness, TO equal to (E/E+LA);
the plate has an active surface area, expressed in $cm^2$, that is intended to face the active surface area of the membrane electrode assembly;
the ribs within the active surface area have a total length, expressed in cm, that is equal to a number of channels on the plate plus one and multiplied by LCA;
LN, expressed in $cm^{-1}$, is equal to the total length of the ribs within the active surface area of the plate divided by the active surface area of the plate;
a product P is equal to LN×TO; and
P is between 7 $cm^{-1}$ and 9 $cm^{-1}$.

2. The fuel cell stack plate of claim 1, wherein, on a plane that is perpendicular to a plane of the plate and also perpendicular to an axis of circulation of the channels, the ribs form right-angled crenellations.

3. The fuel cell stack plate of claim 1, wherein, on a plane that is perpendicular to a plane of the plate and also perpendicular to an axis of circulation of the channels, tops of the ribs are curved and convex.

4. The fuel cell stack plate of claim 1, wherein junctions between lower ends of the ribs and a surface of the plate, that delimits bottoms of the channels, form sharp corners and/or progressive curves.

5. The fuel cell stack plate of claim 1, wherein on a plane perpendicular to a plane of the plate that is also perpendicular to an axis of circulation of the channel delimited by an associated two of the ribs, E is between 0.19 and 0.49 mm.

6. The fuel cell stack plate of claim 1, wherein LA is between 0.5 and 0.92 mm.

7. The fuel cell stack plate of claim 1, wherein LCA is between 50 and 1000 mm.

8. The plate of claim 1, wherein the plate is at least partly made of an electrically conducting material which has been pressed and/or molded and/or mechanically or chemically machined and/or embossed.

9. The plate of claim 8, wherein the electrically conducting material is a metallic material or metal alloy.

10. The plate of claim 9, wherein the plate is at least partially made of expanded graphite.

11. The plate of claim 1, wherein the plate is at least partly made of a composite material that has been molded and/or machined.

12. The plate of claim 11, wherein the composite material is a carbon/polymer composite.

13. A cell of a fuel cell stack, comprising two of the plates of claim 1 sandwiching a membrane electrode assembly.

14. A fuel cell stack, comprising a stack of the cells of claim 13.

* * * * *